United States Patent

Motte et al.

[19]

[11] Patent Number: 5,969,492
[45] Date of Patent: Oct. 19, 1999

[54] INSTRUCTION BROADCAST BY SENSOR

[75] Inventors: Emeric Motte, Sallanches; Laurent Pepin, Vougy; Eric Cheron, Taninges, all of France; Bernhard Holzmayer, Kusterdingen, Germany

[73] Assignee: Somfy, Cluses, France

[21] Appl. No.: 08/978,563

[22] Filed: Nov. 26, 1997

[30] Foreign Application Priority Data

Dec. 6, 1996 [FR] France ................................. 9615021

[51] Int. Cl.$^6$ ........................................ H02P 1/00
[52] U.S. Cl. ................. 318/266; 318/560; 318/569; 318/625; 318/34; 318/51; 364/492; 364/147
[58] Field of Search ................................. 318/266, 560, 318/569, 625, 34, 51; 364/492, 147

[56] References Cited

U.S. PATENT DOCUMENTS

| | | |
|---|---|---|
| 4,492,908 | 1/1985 | Stockle et al. . |
| 5,089,974 | 2/1992 | Demeyer et al. ........................ 364/492 |
| 5,206,568 | 4/1993 | Bjornson et al. ..................... 318/568.1 |
| 5,275,219 | 1/1994 | Giacomel . |
| 5,369,566 | 11/1994 | Pfost et al. ............................ 364/147 |
| 5,532,560 | 7/1996 | Element et al. . |

FOREIGN PATENT DOCUMENTS

| | | |
|---|---|---|
| 4446920 | 12/1994 | Germany . |
| 1520647 | 8/1978 | United Kingdom . |

OTHER PUBLICATIONS

Article, Gebaudesystemtechnik fur den Wohnbau, von Horst Gerlach.

Article, Installation Bus Revolutionizes Building Services, 2466 Engineering & Automation (Siemens) 14 (1992) Sep./Oct. No. 5, Berlin DE.

*Primary Examiner*—Karen Masih
*Attorney, Agent, or Firm*—John Moetteli; Bugnion, S.A.

[57] ABSTRACT

The network (N) links control modules (CM) of a device (M) on the basis of a common instruction and of a quantity measured by a sensor (S) associated with a measurement module (MM). The instruction is formulated in the measurement module and broadcast over the network by the measurement module together with the measurement value.

2 Claims, 1 Drawing Sheet

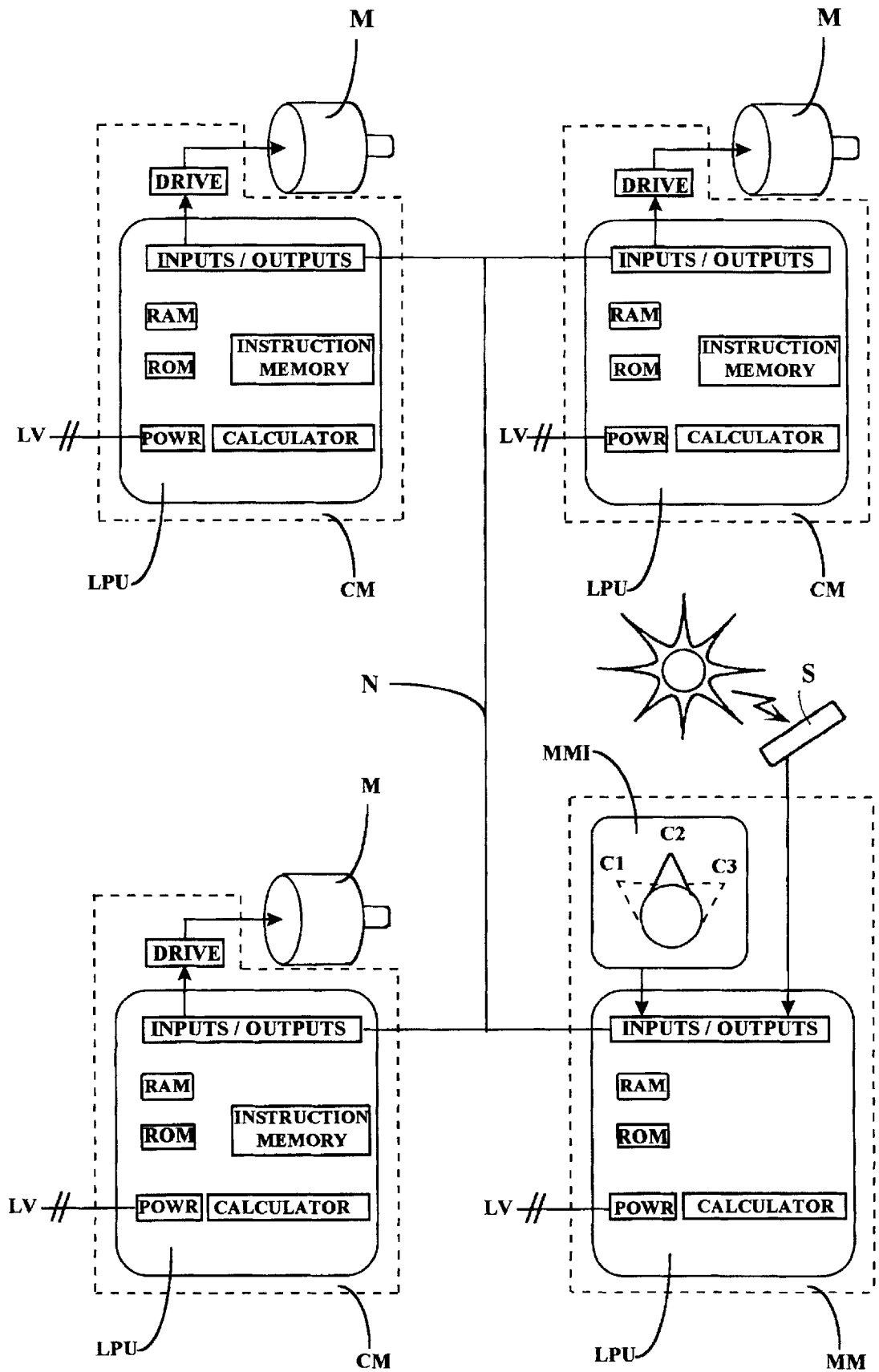

INSTRUCTION BROADCAST BY SENSOR

FIELD OF THE INVENTION

The invention relates to home automation and its subject is a network linking control modules each affording control of a device on the basis of a common instruction and of a quantity measured by a sensor associated with a measurement module linked to the network.

PRIOR ART

Such networks are well known in home automation, for example for controlling shutters or roller blinds of a building. The measured value is for example the amount of sunshine.

In existing networks, each control module is associated with a means for entering the instruction, which generally consists of a man-machine interface. Each control module compares its instruction with the quantity dispatched over the network by the measurement module so as to trigger or not to trigger an action.

When all the control modules have the same instruction, it is possible to dispense with the individual means of inputting the instruction in favor of a common management module which composes the instruction and dispatches it over the network to all the control modules. The control points are simplified, but at the cost of an additional module.

SUMMARY OF THE INVENTION

The object of the invention is to achieve the same result without any additional module.

To this end, in the network according to the invention, the instruction is composed in the measurement module and broadcast over the network by this measurement module.

The measurement module thus broadcasts the measurement value and the instruction value over the network and each control module receives and stores these two values and then compares them so as to trigger or not to trigger an action.

BRIEF DESCRIPTION OF THE DRAWINGS

The drawing represents, by way of example, an embodiment of the invention.

The single FIGURE of the drawing diagrammatically represents a very simple network consisting merely of three control modules CM, and of a measurement module MM. Each of these modules receives electrical energy from the low-voltage network LV. The three control modules CM have an output connected to an electrical load illustrated by a motor M. A network N links together all the modules.

DESCRIPTION OF THE PREFERRED EMBODIMENT(S)

Each control module is made up of a logic processing unit LPU and an electrical load drive for powering the motor. Each LPU is made up of a volatile memory of RAM type for the calculations, a permanent memory of ROM type to contain the application program, a power supply POWR, a permanent but rewritable memory of EEPROM type for recording at will the instruction broadcast by the measurement module, and a facility for managing the inputs and outputs.

The measurement module MM is made up of a logic processing unit LPU and a man-machine interface MMI so as to allow input of one instruction value, for example C2, from among three instructions C1, C2 or C3.

The LPU of the measurement module is made up of a volatile memory of RAM type for the calculations, a permanent memory of ROM type to contain the application program, a power supply POWR and a facility for managing the inputs and outputs. The measurement module MM has an input connected to a sensor S consisting here of a photosensitive cell for measuring the amount of sunshine.

The measurement module MM composes the instruction and broadcasts, over the network N, the instruction value and the measurement value calculated from the quantity delivered by the sensor S. Each control module CM receives and stores these two values together and then compares them so as to trigger or not to trigger an action on the motor M.

What is claimed is:

1. A network (N) comprising control modules (CM) which are linked, each control module controlling a device (M) on the basis of a common instruction and a quantity measured by a sensor (S) associated with a measurement module (MM) linked to the network (N), wherein the instruction is formulated in the measurement module and broadcast over the network by the measurement module together with the measurement value for interpretation by each device.

2. A network comprising:

a plurality of control modules, said plurality of control modules being linked, each control module controlling a device, a sensor, a measurement module, said measurement module being connected to said sensor to receive a quantity measurement from said sensor, said measurement module calculating an instruction value and a measurement value from the quantity measurement received from the sensor, and said measurement module being connected to each of said control modules to deliver to said control modules said instruction value and said measurement value.

* * * * *